US005457367A

United States Patent [19]
Thorne

[11] Patent Number: 5,457,367
[45] Date of Patent: Oct. 10, 1995

[54] TOOL CENTER POINT CALIBRATION APPARATUS AND METHOD

[75] Inventor: Henry F. Thorne, Pittsburgh, Pa.

[73] Assignee: Cycle Time Corporation, Pittsburgh, Pa.

[21] Appl. No.: 103,459

[22] Filed: Aug. 6, 1993

[51] Int. Cl.⁶ .............................. H04N 7/18; G05B 19/36
[52] U.S. Cl. .................. 318/568.11; 318/568.13; 901/9
[58] Field of Search ................... 318/560–646; 395/80–90; 901/3.5, 7, 9, 12, 13, 15, 23, 47; 73/15, 4 R, 628, 627, 587; 367/906; 250/560, 561; 356/375; 414/273, 730; 118/712, 323, 669

[56] References Cited

U.S. PATENT DOCUMENTS

| | | | |
|---|---|---|---|
| Re. 34,345 | 8/1993 | Vinarub et al. | 356/384 |
| 4,095,475 | 6/1978 | Buckley | 73/628 |
| 4,200,921 | 4/1980 | Buckley | 367/87 |
| 4,287,769 | 9/1981 | Buckley | 73/627 |
| 4,459,526 | 7/1984 | Griebeler | 318/576 |
| 4,523,287 | 6/1985 | Kogawa | 318/573 X |
| 4,585,947 | 4/1986 | Liptay-Wagner et al. | 250/560 |
| 4,639,878 | 1/1987 | Day et al. | 901/9 X |
| 4,662,752 | 5/1987 | Tucker et al. | 901/47 X |
| 4,754,415 | 6/1988 | George et al. | 901/7 X |
| 4,766,322 | 8/1988 | Hashimoto | 901/9 X |
| 4,796,200 | 1/1989 | Pryor | 364/513 |
| 4,894,788 | 1/1990 | Stelzer | 364/513 |
| 5,119,759 | 6/1992 | Hicks | 118/712 |
| 5,148,963 | 9/1992 | Hicks | 228/102 |
| 5,177,563 | 1/1993 | Everett et al. | 356/375 |
| 5,194,792 | 3/1993 | Hara | 318/568.13 |

OTHER PUBLICATIONS

Henry F. Thorne, *Robotics Today*, Fourth Quarter 1989, vol. 2, No. 4, "Robotic Arc Welding in a Flash".

Al B. Knasinski et al., "Robot Calibration & Off–Line Programming, An Industrial Solution", Feb. 1993.

Mikael Eriksson, "Determination of Tool Centre Points", pp. 4–8, 21, 22, 33–37, 43–55, 67, 71, 82 and 83.

*Primary Examiner*—Paul Ip
*Attorney, Agent, or Firm*—Webb Ziesenheim Bruening Logsdon Orkin & Hanson

[57] ABSTRACT

The present invention provides a tool center point calibration apparatus and method for accurately determining appropriate tool center points for a robot to allow for proper tool alignment and correction of robot programs. The calibration apparatus includes a calibration beam on a single line.

15 Claims, 10 Drawing Sheets

TOOL CENTER POINT CALIBRATION APPARATUS AND METHOD

BACKGROUND OF THE INVENTION

1. Field of the Invention

The present invention provides a tool center point calibration apparatus and method for accurately determining appropriate tool center points for a robot to allow for proper tool alignment and correction of robot programs.

2. Prior Art

A tool center point is a six-dimensional vector defining the tool tip position of a robot tool with respect to a robot face plate. The tool center point is essential so that the robot knows precisely where the tool is located. Although a robot will know the precise location of the robot face plate at any given time, a robot may not precisely know the tool center point for a specific tool due to a variety of reasons. The tool center point for a specific tool of a given tool type will vary between individual tools. Consequently, prespecified tool center points are not entirely accurate for an individual tool. Additionally, the tool center point may change due to a crash or wearing of the tool. The robot requires precise location of the tool center point for appropriate operation.

Consequently, methods of determining the tool center point will provide means for correcting a robot program if the tool position changes due to a crash, tool change or other extraneous factors. Additionally, accurate measurement can provide for the correction of a robot program generated with the assumption of a perfect tool (i.e., a tool which exactly aligns with specifications).

A known method for determining a tool center point is physically measuring the location and orientation of the tool with respect to the robot face plate and entering the measured tool center point. Subsequent to entering the initially measured tool center point, the gun is swiveled about the position assumed to be the tool center point. If the tip of the tool moves, the assumed tool center point is adjusted. When the tip of the tool does not move when pivoted about the assumed tool center point, the appropriate tool center point has been achieved. This procedure takes approximately fifteen minutes for a skilled technician and has an accuracy of about ±8 mm. The method requires a skilled technician, a significant amount of down time for the robot and only offers minimal accuracy.

A system for updating tool center point values for tools has been devised which utilizes a fixed target or bull's-eye in a precise location. The robotic arm is moved to the known target location and the tool is adjusted until the tool tip is appropriately aligned with the target. This procedure again requires a skilled technician and takes approximately ten minutes. The accuracy of the resulting tool center point is within approximately ±2 mm. The difficulty with this solution is that it requires a skilled technician, is time-consuming and may result in tool damage.

Alternatively, the tool center point may be determined in a prior art method by removing the tool from the robot, moving the robot face plate to a fixed, known position, remounting the tool and taking the tips to the same known position. This removal of remounting of the tool can take twenty minutes with an accuracy of only ±3 mm.

A double beam calibration unit has been designed, specifically for the calibration of arc welding units. See the article "Robotic Arc Welding in a Flash" by the applicant in *Robotics Today*, Vol. 2, Number 4, Fourth Quarter 1989. The drawbacks of this system are that it requires a pair of orthogonal beams and is limited to specific types of tools.

The object of the present invention is to provide an efficient apparatus and method for determining the tool center point of robotic tools which is applicable to different types of robotic tools. Additionally, the object of the present invention is to provide a method and apparatus for calibrating spot welding guns for robotic tools.

SUMMARY OF THE INVENTION

The present invention provides a tool center point calibration unit for a robot. The tool center point calibration unit includes a frame positioned within the robot envelope. A tool center point calibration device is supported on the frame with the calibration device having a centerline positioned along a single line. The tool center point calibration device generates a signal adapted to indicate when the tool tips are at the centerline.

The calibration device may be positioned substantially parallel to a robot axis and may be positioned such that the robot is adapted to reach the calibration device with a tool tip axis substantially parallel to one of the robot axes.

In one embodiment of the present invention, the calibration device is a single beam. In this embodiment the frame is preferably a base with a post extending from the base and a pair of spaced arms extending from the post to the single beam, wherein the single beam extends between the pair of spaced arms. A fiber-optic cable may be supported within the frame to generate the single beam.

The present invention includes a method for tool calibration for a robot tool. The method includes the steps of positioning a calibration device within the robot envelope, wherein the calibration device includes a beam having a centerline positioned along a single line. The tool tip is positioned to an initial position within the path of the beam. Values of the robot face plate are obtained with the tool tip at the initial position within the beam path. The tool is rotated about the axis of the tip to at least a second position with the tool tip positioned within the beam path. Additional values of the robot face plate with the tool tip at the subsequent position(s) are obtained and a tool center point is calculated based upon the obtained values. The tool may then be aligned based upon the calculated tool center point. Alternatively, the robot can automatically adjust the movement of the tool in operation to account for the new tool center point.

The method is well adapted for a spot welding robot. In a preferred embodiment of the present invention, the method for tool calibration is for a spot welding robot having a welding tool including a pair of opposed tool tips positioned along a tool axis. The method comprises the steps of:

a) positioning a calibration device within the robot envelope, wherein the calibration device includes a beam having a centerline positioned along a single line;

b) positioning a first of said pair of opposed tool tips within the path of the beam;

c) profiling the first tool tip by moving the welding tool relative to the beam;

d) positioning the first tool tip to an initial position based upon the tip profiling wherein the beam path intersects the first tool tip at a center point positioned at a midpoint of a substantially cylindrical portion of the first tool tip;

e) calculating an initial approximation for the center point position of the first tool tip;

f) obtaining values of the robot face plate with the tool tip at the initial position;

g) rotating the welding tool from the initial position to a second position about an axis substantially perpendicular to the centerline of the calibration device to a second position;

h) obtaining values of the robot face plate with the tool tip at the second position;

i) rotating the welding tool about the axis substantially perpendicular to the calibration device to a third position;

j) obtaining values of the robot face plate with the tool tip at the third position;

k) rotating the tool about an axis substantially parallel to the calibration device to a fourth position;

l) obtaining values of the robot face plate with the tool tip at the fourth position;

m) calculating the center point position of said first tip;

n) repeating steps b through m for the second of said pair of tool tips;

o) calculating the tool centerline which is along the line extending between the center points of the pair of tool tips;

p) profiling a pair of tool tips to determine the narrowest profile between the center points of the first and second tool tips; and q) calculating a tool center point along the narrowest profile.

These and other objects of the present invention will be clarified in the description of the preferred embodiments in connection with the attached drawings.

BRIEF DESCRIPTION OF THE PREFERRED EMBODIMENTS

Figure 1:
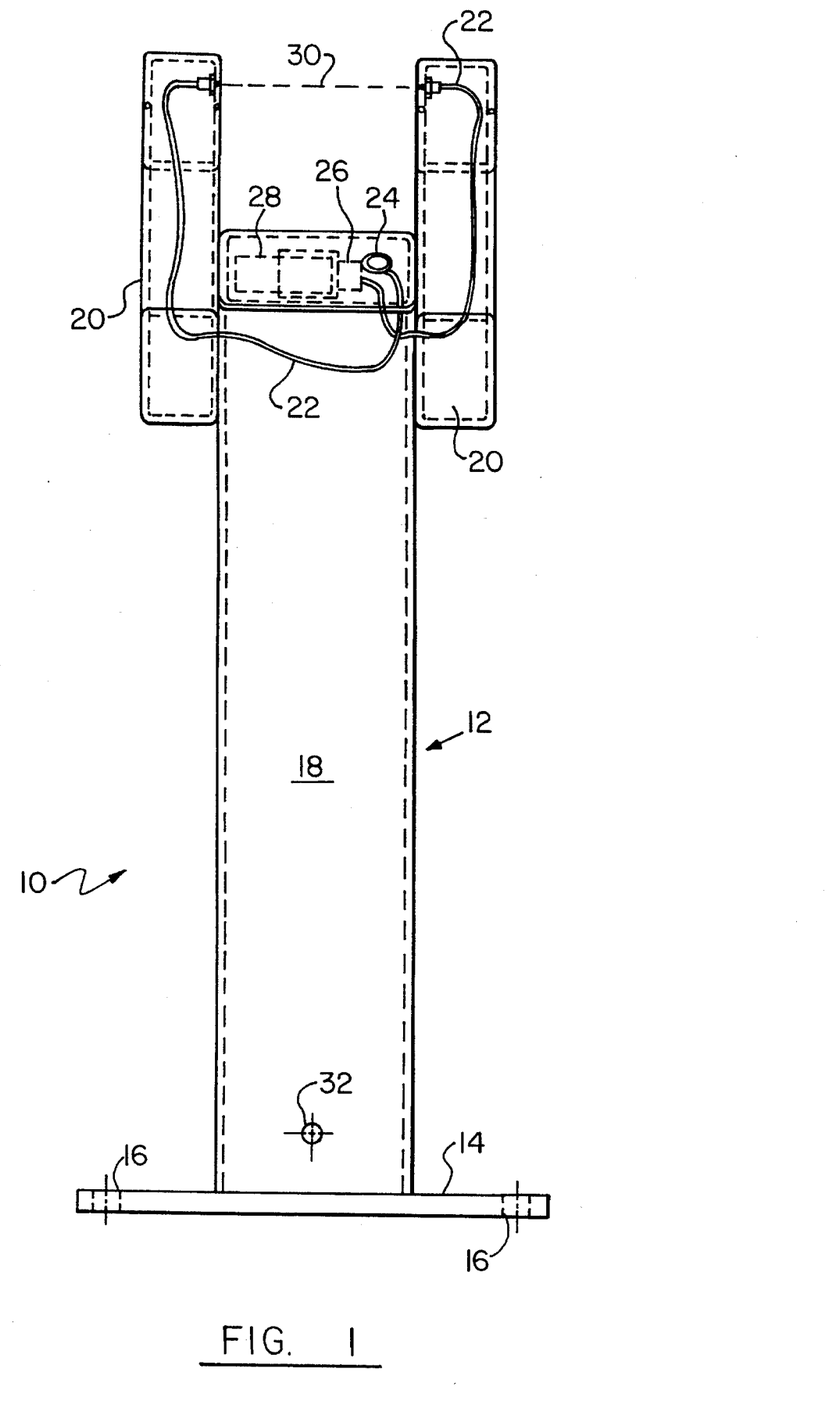
FIG. 1 is a front view of a calibration unit of the present invention.
Figure 2:
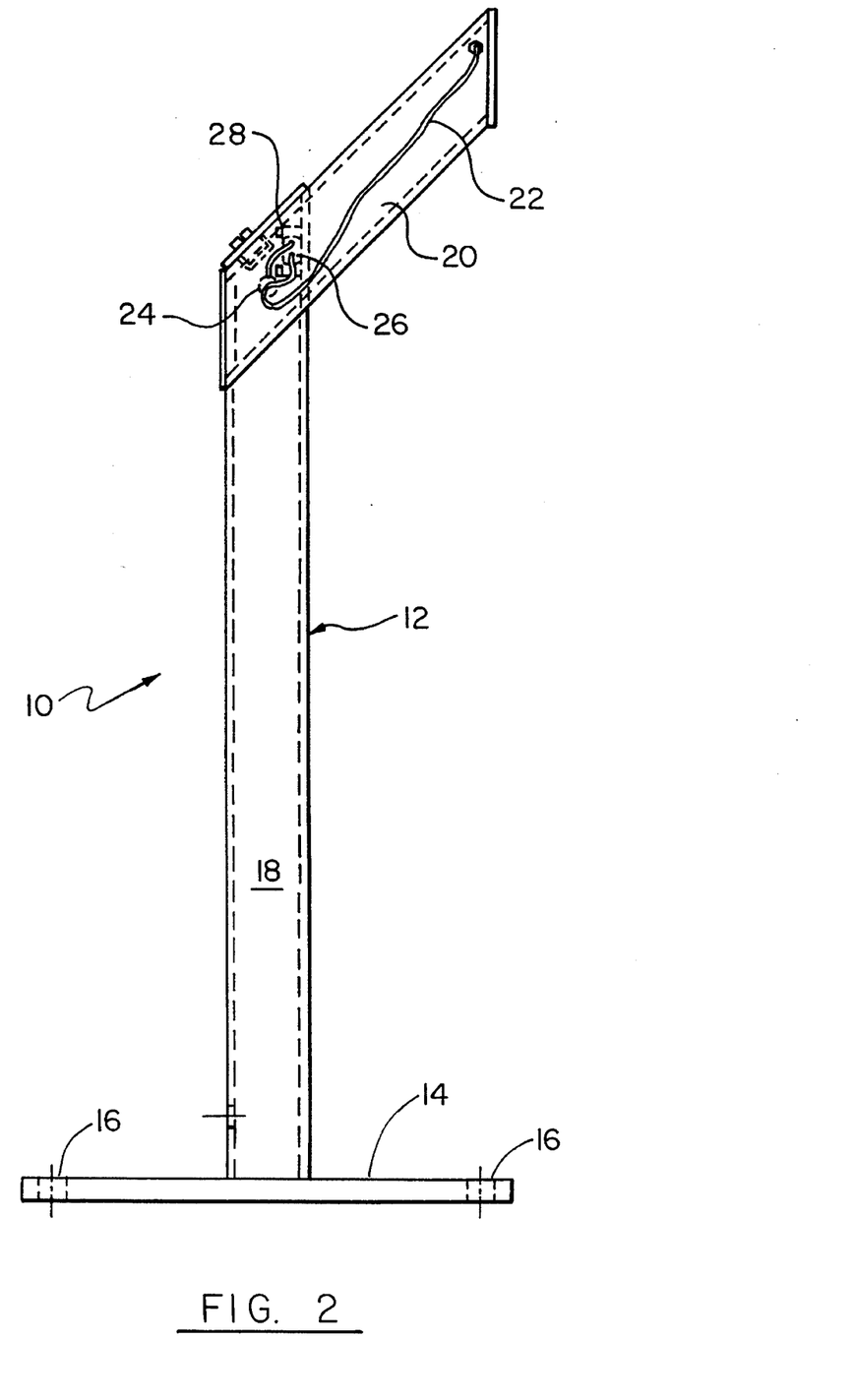
FIG. 2 is a side view of the calibration unit shown in FIG. 1.
Figure 3:
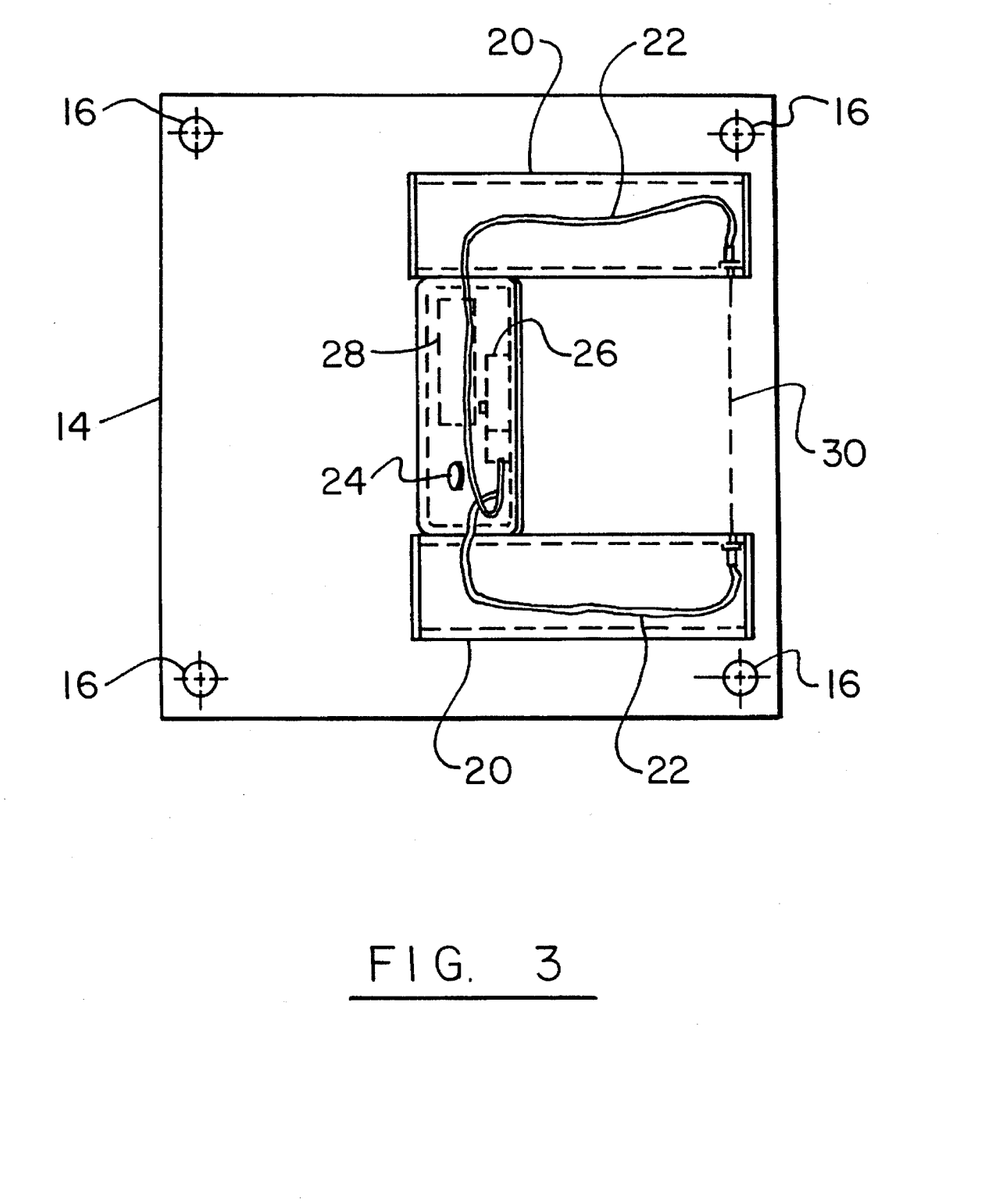
FIG. 3 is a top view of the calibration unit shown in FIGS. 1-2.

FIGS. 1-3 illustrate a tool center point calibration unit 10 according to the present invention. The calibration unit 10 includes a frame 12 which is adapted to be positioned within the robot envelope, as will be described hereinafter. The frame 12 has a substantially flat base 14 which may be bolted to the floor of the robot cell through mounting holes 16. A post 18 is coupled to the base 14 and extends substantially vertically therefrom to a pair of spaced arms 20. Arms 20 extend from an upper end of the post 18 extending away therefrom at an angle of approximately 45°. Fiber-optic cable 22 is supported within the frame 12. LED 24, amplifier 26 and terminal strip 28 are positioned within the arms 20 to generate a single beam 30 (shown in phantom). A lead (not shown) may connect the calibration unit 10 to the robot computer with access hole 32 allowing the lead to extend into the frame 12. A signal is sent to the robot computer indicating whether the beam 30 is broken or not (i.e., whether an object is within the beam path). The single beam 30 is approximately 1 mm in diameter and has a centerline positioned along a single line. The beam 30 is utilized as a calibration device for calculating the tool center point of a robot tool, as will be described hereinafter. The beam is preferably positioned substantially parallel to a robot axis and is positioned such that the robot is adapted to reach the calibration device with a tool tip axis substantially parallel to one of the robot axes. It should be understood that the preferred orientation simplifies the required calculations and that any known orientation may be utilized with appropriate vector transformations included into the calculations.

Figure 4:
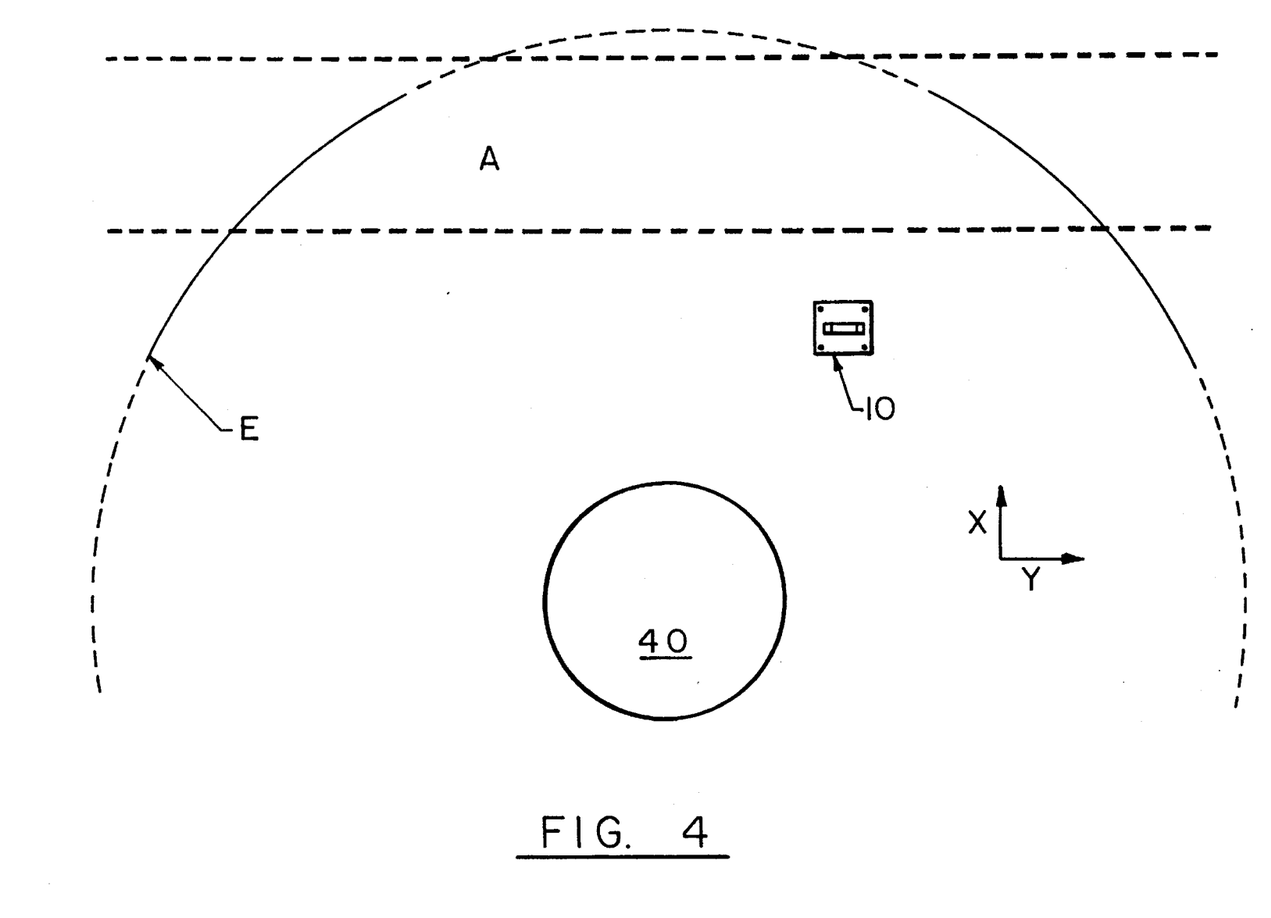
FIG. 4 schematically illustrates the position of a calibration unit of the present invention within a robot cell.
Figure 5:
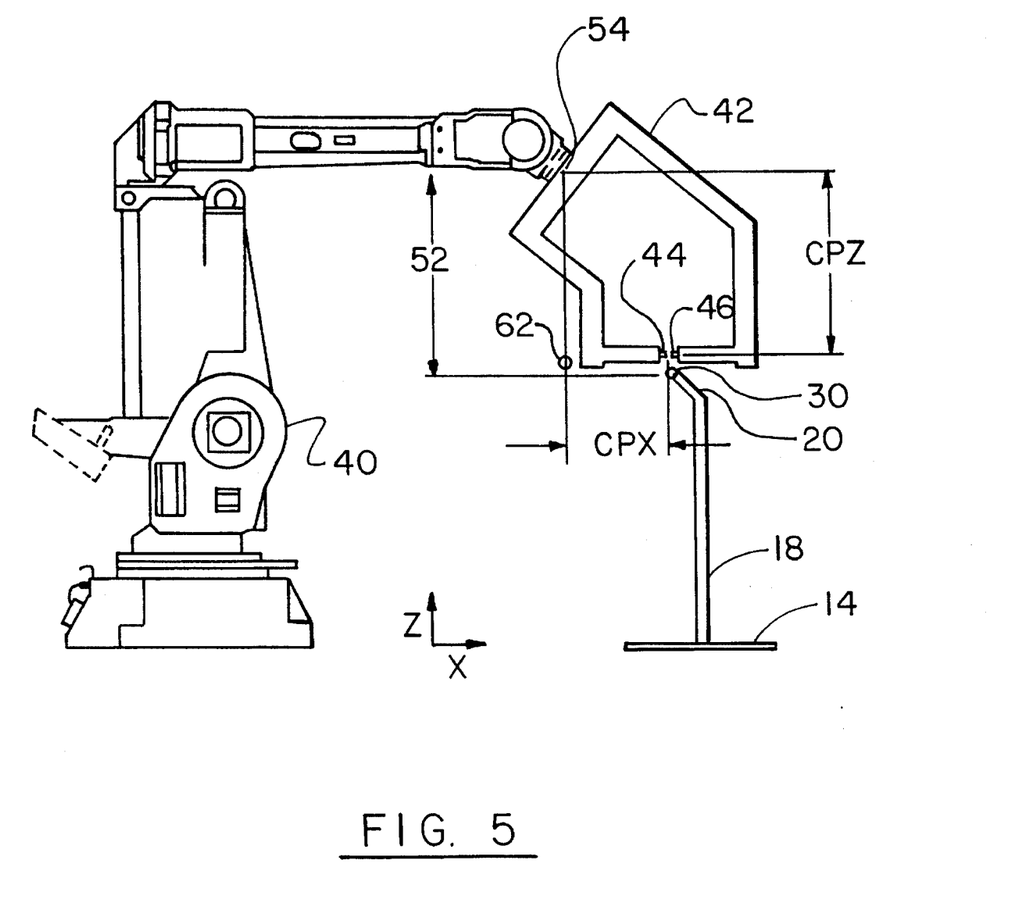
FIG. 5 schematically illustrates the calibration unit shown in FIG. 4 and a robot to be calibrated.

The operation of the tool center point calibration unit 10 will now be described in connection with FIGS. 4-11. As illustrated in FIG. 4, the tool center point calibration unit 10 may be bolted to the floor of a robot cell within the envelope of a robot 40, preferably when the following requirements are satisfied. First, the beam should be substantially parallel to the X or Y axis of the robot 40 within about 5°. The robot 40 should be adapted to reach the beam 30 with a gun or tool tip axis of a tool 42 substantially parallel to the robot's X, Y or Z axis within about 5°, as shown in FIG. 5. Finally, the robot 40 should be able to rotate the tool 42 about 30° in both directions about the tool tip axis without collision or hitting a software limit. Robot 40, illustrated in FIGS. 4-11, is a spot welding robot with opposed tool tips 44 and 46.

The tool center point calibration unit 10 has two separate procedures for operation. The initial setup is run only once where the robot 40 starts with no information about where the beam 30 is and inaccurate information or no information on the tool center point values. The initial setup takes approximately ten minutes. The second procedure is an update where the robot knows the position of the beam and starts with a good approximation of the tool center point values. The update procedure takes approximately one minute to run.

In the initial setup, the operator must manually jog the robot 40 to a start position where the tips are first breaking the beam 30. In this initial setup, the robot starts with the tip 44 in an arbitrary location 50 with respect to the beam, as schematically illustrated in FIG. 6.

Following this initial setup, the operator must either enter an initial estimation for the tool center point values with the initial estimate being accurate within ±2 inches of the actual tool center point or, alternatively, enter the height 52 between the beam center and the center of the robot face plate 54, as shown in FIG. 5. The latter method is preferred since it minimizes the required input from the user and the required input (i.e., the height 52) is generally more accurately obtained than a tool center point approximation. These initial inputted values are important only to avoid collisions with the tool center point calibration unit 10. These initial estimations bear no accuracy or impact on the final tool center point calculated by the present process.

Figure 6:
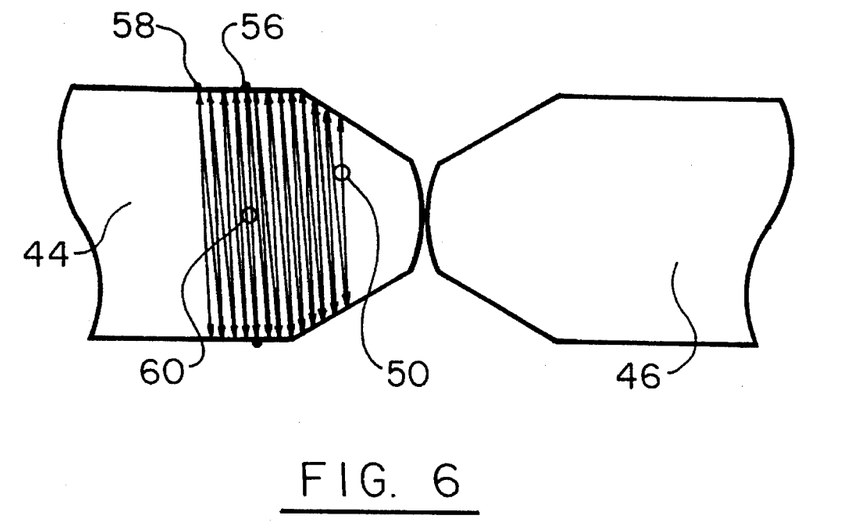
FIG. 6 schematically illustrates a profiling procedure for a tool tip according to the present invention.

The next procedure, schematically illustrated in FIG. 6, is a profiling of the tool tip 44. Profiling is accomplished by moving the tool tip 44 relative to the beam 30 to determine the cross-sectional distance of the tool tip 44 in a plane parallel to the beam path 30. The profiling begins with the beam intersecting the tip 44 initially at arbitrary location 50. The robot will move the tip 44 in a plane parallel to the beam path until the beam 30 is no longer broken, indicating an edge of the tool tip 44. The position of the robot face plate 54 is noted by the robot 40. The movement of the tip 44 is reversed until the beam 30 is again detected indicating the other edge of the tool tip 44 within the plane. The cross-sectional distance of the tool tip 44 is determined by the change in the position of the robot face plate 54 between the opposed edges of the tool tip 44. The movement in both directions during profiling minimizes errors due to inertia of the tool 42 and robot 40.

The process is repeated for a plurality of closely spaced, parallel planes along the tool tip 44, as schematically illustrated in FIG. 6. The procedure proceeds until four substantially identical, adjacent cross-sectional distances of the tool tip 44 are found. The position of this cross-sectional plane 56 is recorded and the process is continued. If four additional matches are obtained, the search is stopped. The previously recorded position of the fourth match at plane 56 is utilized as an indication of a substantially cylindrical portion of the tool tip 44. The tool tip 44 is moved by the robot 40 so that the beam 30 is positioned substantially midway along the plane 56 at the center point 60. Consequently, the result of the tip profiling procedure is that the tip 44 is placed where the beam 30 intersects the axis of a cylindrical portion of the tool tip 44 substantially midway along the tool tip 44 at center point 60.

Figure 7:
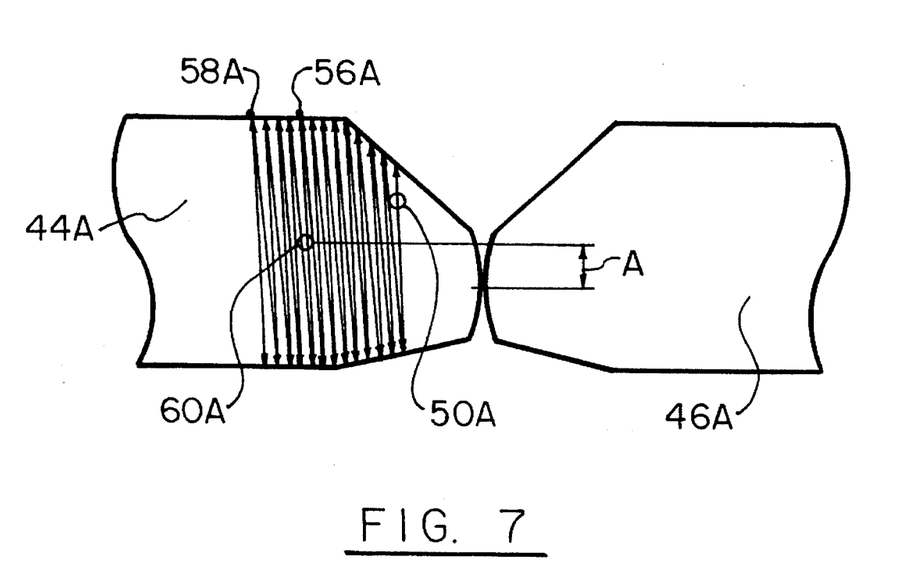
FIG. 7 schematically illustrates the profiling procedure of FIG. 6 performed on offset tool tips.

FIG. 7 illustrates the tip profiling procedure on nonsymmetric tool tips 44A and 46A. As illustrated in FIG. 7, the present method will still position the tip 44A in the beam 30 with the beam 30 in a substantially cylindrical center portion of the tool tip 44A at center point 60A.

Figure 8:
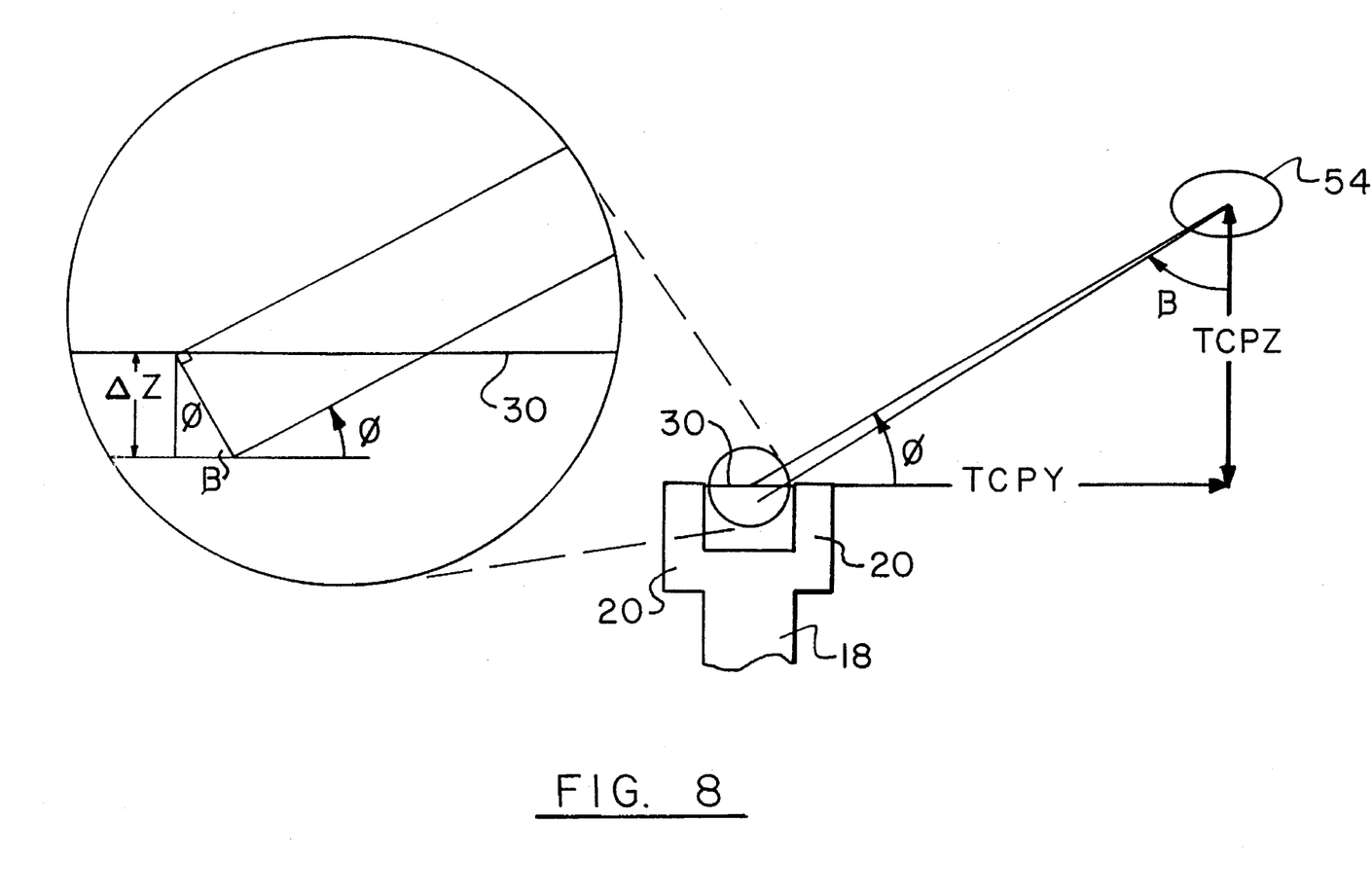
FIG. 8 schematically illustrates a center point estimation procedure which may be utilized in the calibration process of the present invention.

In the initial operation, if the height 52 between the beam 30 and the robot face plate 54 is entered by the user, the center point position along the Y axis (CPY) can be approximated by rotating a very small amount, for example, 3/100 of a radian or approximately 1.719°, about the robot face plate 54 parallel to the robot's X axis. The CPY is approximated by dividing the change in the height of the tool 42 ($\Delta Z$) divided by the small angle of rotation in radians. This approximation can be made with a high degree of accuracy and is schematically illustrated in FIG. 8. The change in the Z position of the tool 42 ($\Delta Z$) is determined after the tool 42 rotation about the robot face plate 54, and the change is determined by moving the tool 42 relative to the beam 30 in the Z axis direction, then noting the change in the robot face plate position in the Z axis.

Figure 9:
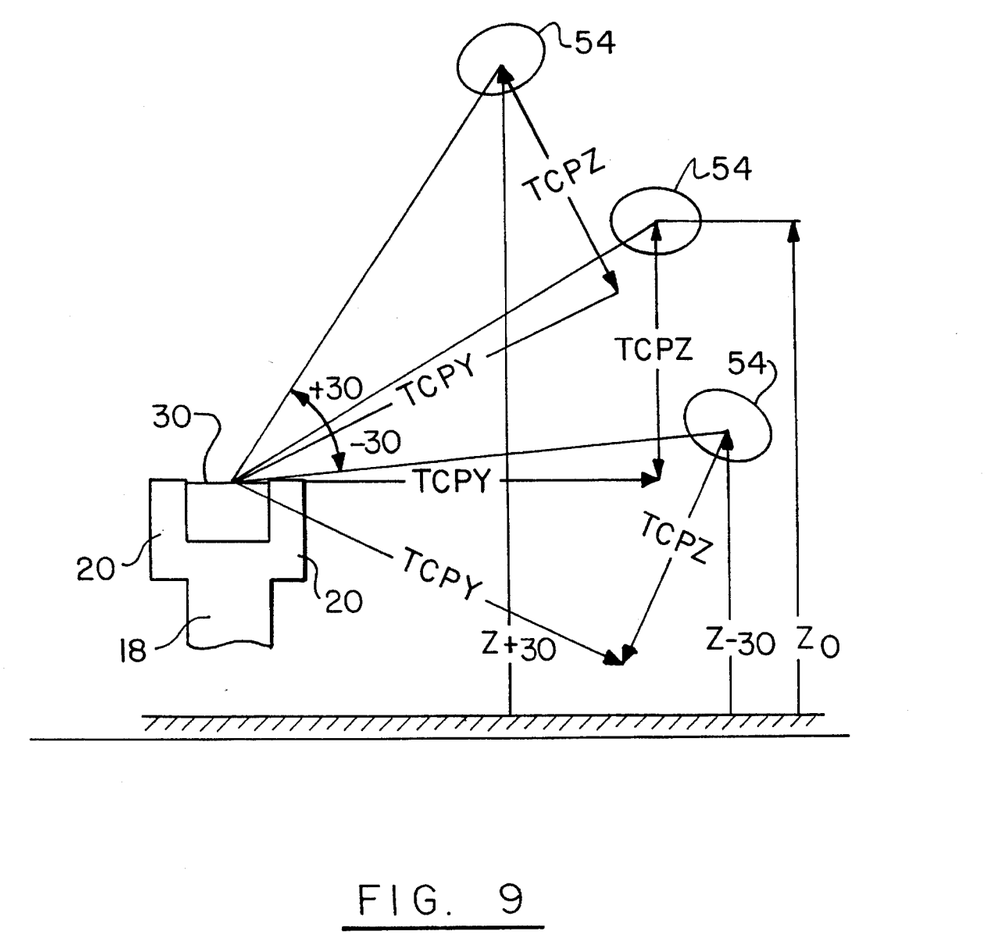
FIG. 9 schematically illustrates the position of the robot face plate following rotation about the tool tip axis.

With the beam 30 positioned at center point 60 within the midpoint of a substantially cylindrical section of the tool tip 44 and initial approximation of the CPY and CPZ, the tool tips 44 and 46 can be rotated about the tool tip axes ± an angle $\phi$, for example 30°, as illustrated in FIG. 9. Measurements of the center point at all three locations can be utilized to determine the values for CPY and CPZ. The measurements relate to the known position of the robot face plate 54 at any position. The CPY and CPZ values can be determined based upon these three measurements because the respective CPY and CPZ orientations will rotate with the appropriate robot face plate 54, and specific position of the robot face plate 54 (i.e., Z0, Z–$\phi$ and Z+$\phi$) are known in any position. Consequently, one equation for each specific measurement is obtained. The three equations can be summarized as follows:

$$CPZ = (Z-\phi + Z+\phi - 2Z0)/2(\cos \phi - 1)$$

$$H = Z0 - CPZ$$

$$CPY = (Z+\phi - H - CPZ \cos \phi)/\sin \phi$$

In the above equations, $\phi$ is the angle of rotation about the tool tip axis. Solving these three equations for the three unknowns will determine two of the three dimensions.

Figure 10:
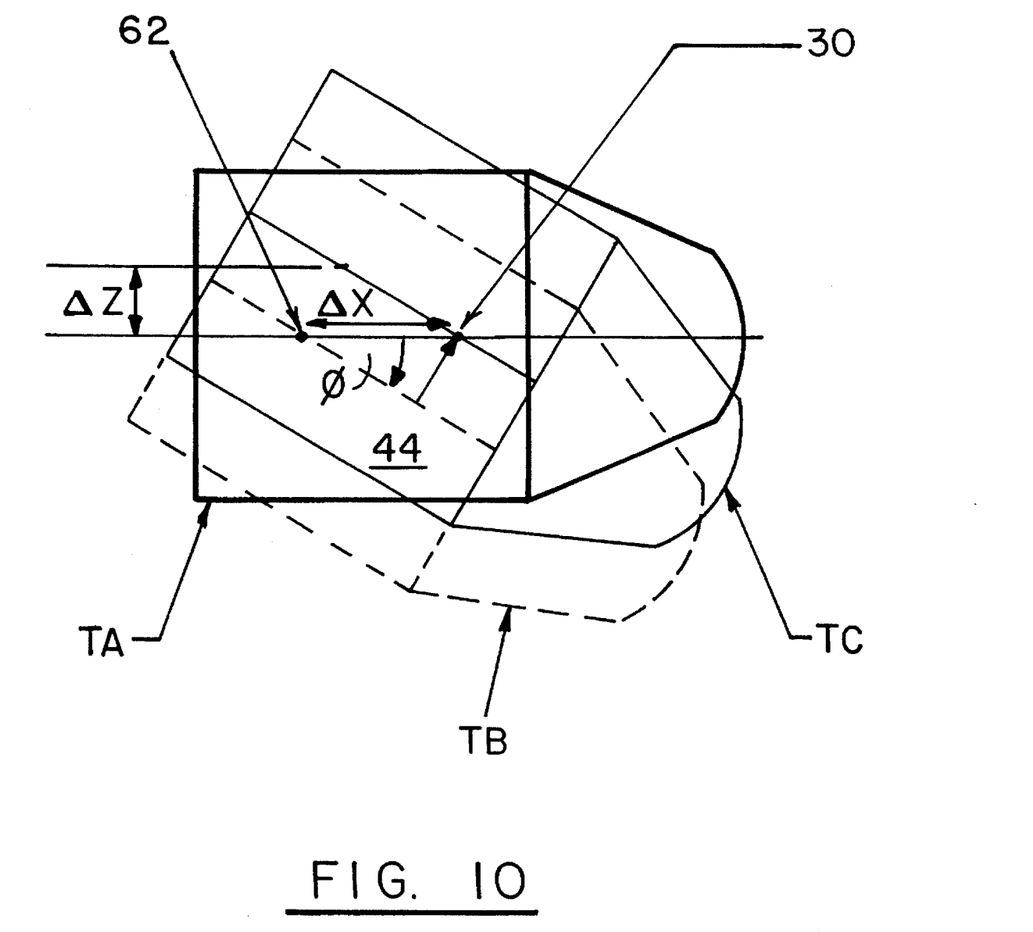
FIG. 10 schematically illustrates relative tool tip positions during a process to correct the tool center point values according to the present invention.

The remaining unknown is the dimension CPX, illustrated in FIG. 5, which is substantially perpendicular to the beam 30. In order to determine the unknown dimension CPX, a dummy center point 62 at a position of –CPZ from the robot face plate 54 is generated, as shown in FIG. 10. The robot 40 can rotate a small degree, for example 3/100 of a radian, about the dummy center point 62. An estimation of the CPX is obtained by dividing the change in height of the tool 42 ($\Delta Z$) by the degree of rotation in radians. This procedure is similar to the estimation of the CPY, described above in connection with FIG. 8, wherein only the height between the beam 30 and the robot face plate 54 was entered. As discussed above, the change in the height of the tool 42 ($\Delta Z$) is proportional to the distance CPX. Alternatively, an estimation for the CPX may be determined by bolting the calibration unit 10 to the robot cell where the beam 30 is at a known position relative to the robot face plate 54.

The process can be repeated to determine a correction for the estimated CPX value, as shown in FIG. 10. The tool tip 44 is again rotated about the estimated center point. The change in the height of the tool tip 44 ($\Delta Z$) is measured by moving the tool 42 until the beam 30 again intersects and is centered on the tool tip 44 and noting the change in the height of the robot face plate 54. The correction to the estimated CPX position is given by $\Delta X = \Delta Z/(\sin\phi\cos\phi)$. The center point 60 for the first tip 44 is now known.

The entire process is now repeated through the opposite tip 46. At this point, or at any time following the determination of the center point 60 shown in FIG. 6, the location of meeting plane 70 or point of contact between the opposed tool tips 44 and 46 is determined. The process is shown schematically in FIG. 11. The tool tip 44 is scanned horizontally a distance of about 25 mm along a line 72 positioned 4 mm above the center point 60. If the beam 30 remains unbroken, the process is repeated in the opposite direction. If the beam 30 again remains unbroken, then the process is repeated along a line 74 another millimeter above the line 72. Upon finding where the beam 30 is no longer broken, indicating an edge of the tool tip 44, a hill descend procedure is followed to locate the meeting plane 70.

The hill descend procedure begins by scanning the diameter of the tool tip 44 similar to the profiling step shown in FIG. 6. The tool tip 44 is moved about 2 mm along the tool tip axis and a new diameter is determined. If the new diameter is greater than the old diameter by more than 0.5 mm, the process is repeated in the opposite direction. The narrowest diameter found indicates the meeting plane 70.

Figure 11:
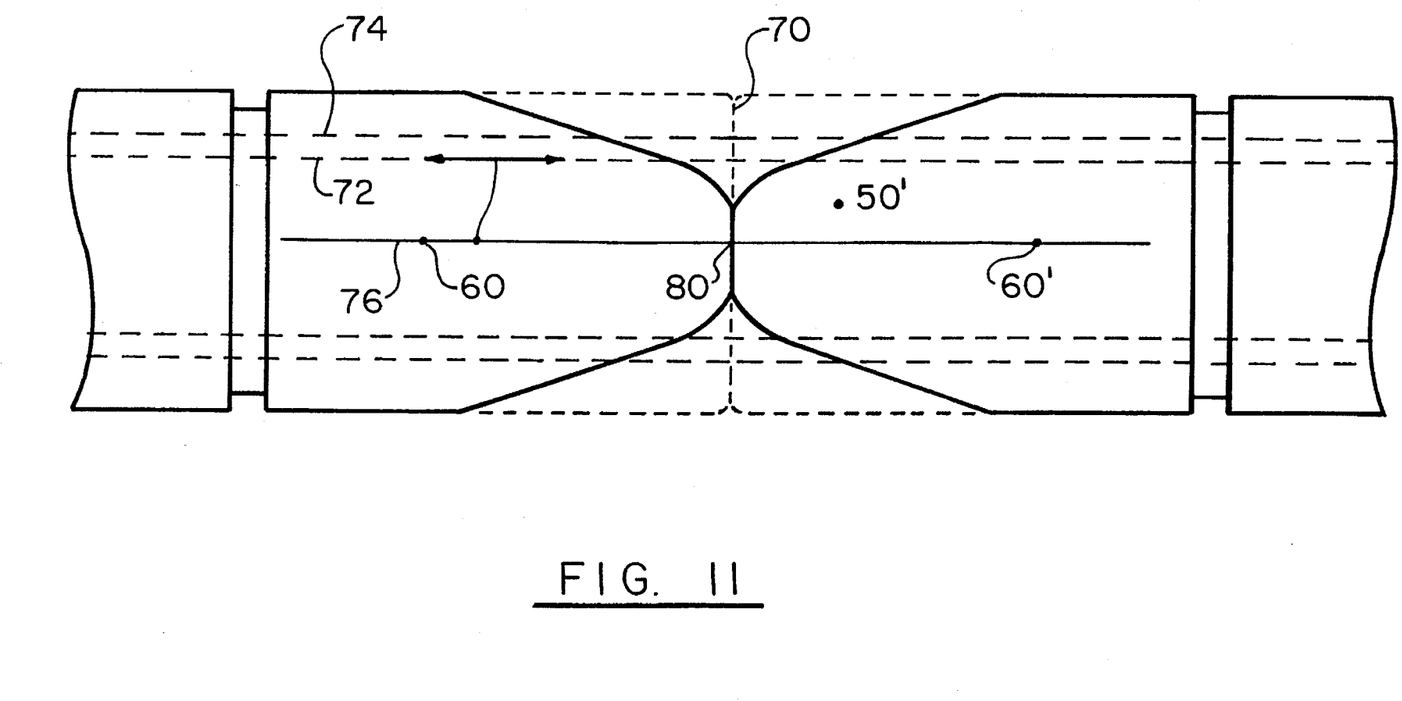
FIG. 11 schematically illustrates a procedure for determining the contact point of opposed tool tips and the tool center point.

Beginning from an arbitrary location 50' on the opposite side of the meeting plane 70, the tool tip 46 is zigzagged away to perform a profiling until a center point 60' for the tool tip 46 is obtained.

Upon repeating the entire procedure for the tool tip 46, two center points 60 and 60' for each tip 44 and 46 can then be calculated. The centerline 76 of the tool 42 is now known. The tool centerline axis is the line joining the two known center points 60 and 60'. The robot 40 may align the tool centerline axis to a robot major axis and may repeat the entire calibration process from the beginning. The purpose of this repetition is to remove any error caused by the misalignment of the beam 30. During this round of the process, the beam 30 should be broken in the same place. It should be noted that after the initial setup, the process may be started from this position.

The meeting plane 70 may now be used to indicate the position of the tool center point 80 for the pair of tool tips 44 and 46. The distance between a tool center point 60 or 60' and the narrowest section at the meeting plane 70 can be added to one of the center points 60 or 60' to calculate a tool center point 80 for the tool 42. The tool 42 can be appropriately aligned and/or the control system corrected for the known tool center point 80.

If there is an offset in the tool tips, as shown in FIG. 7, the offset A is determined during the profiling step and will be added to the calculated tool center point 80.

Generating a tool center point vector from a given, known world coordinate vector is done using the Euler transform:

$$\begin{bmatrix} \text{CosACosBCosC}-\text{SinASinC} & \text{CosACosBSinC}-\text{SinACosC} & -\text{CosASinB} \\ -\text{SinACosBCosC}-\text{CosASinC} & -\text{SinACosBSinC}-\text{CosACosC} & \text{SinASinB} \\ \text{SinBCosC} & \text{SinBSinC} & \text{CosB} \end{bmatrix}$$

wherein A, B and C have current Euler angles of the robot face plate coordinate system.

The present tool center point calibration unit 10 provides several distinct advantages over the prior art system. The present system requires very little mechanical setup requiring the tool center point calibration unit 10 to merely be bolted to the floor. The electrical setup is additionally minimal, requiring one signal to the robot. The software setup is simplified, requiring only the operator to jog the tool 42 to the calibration unit 10 and run the supplied software. The present calibration unit 10 provides increased accuracy measuring the tool center point 80 to within ½ mm. Additionally, the present system provides a fast calibration method with the setup being approximately ten minutes and updates being one minute or less. The simple design of the present invention provides for rugged construction and low cost. Additionally, the present invention can run on any robot (ABB, KUKA, etc.). Additionally, no external computer is required for the operation of the present system which can operate with the computer system on board the robot manipulator.

While preferred embodiments of the present invention have been described herein, it will become apparent to those of ordinary skill in the art that various changes and modifications to the present invention may be made without departing from the spirit and scope thereof. For example, the beam 30 may be replaced with a contact wire or other type of sensor sufficient to indicate the presence of the tool tip along a line. Consequently, the scope of the present claims is intended to be limited only by the scope of the appended claims.

I claim:

1. A method for tool calibration for a robot with a robot face plate having a tool with a tip axis, said method comprising the steps of:

a) positioning a calibration means within the robot envelope, wherein said calibration means includes a beam having a centerline positioned along a single line;

b) positioning said tool tip to an initial position within the path of said beam;

c) obtaining values of said robot face plate with said tool tip positioned within said beam path;

d) rotating said tool about said tip axis to at least a second position with said tool tip positioned within said beam path;

e) obtaining values of said robot face plate with said tool tip positioned at said at least second position; and f) calculating a tool center point based upon said obtained values.

2. The method of claim 1 wherein said robot is a spot welding robot.

3. The method of claim 1 further comprising the step of:

positioning said calibration means substantially parallel to a robot axis wherein the robot is adapted to reach said calibration means with said tool tip axis substantially parallel to a robot axis.

4. The method of claim 1 wherein said positioning of said tool tip to said initial position comprises:

positioning said tool tip in an arbitrary location within said beam path;

profiling said tool tip with said beam by moving said tool tip relative to said beam, calculating said initial position based upon said profile, wherein said initial position is in a midpoint of said tool tip; and positioning said tool tip at said initial position.

5. The method of claim 4 wherein said initial position is within a substantially cylindrical portion of said tool tip.

6. The method of claim 5 wherein said tool tip profiling comprises:

sequentially determining the cross-sectional lengths of said tool tip in planes parallel to the beam, wherein a plurality of substantially similar cross-sectional lengths in adjacent planes indicates said substantially cylindrical portion of said tool tip.

7. A method for tool calibration for a spot welding robot having a robot face plate with a welding tool attached to said robot face plate and including a pair of opposed tool tips positioned along a tool axis, said method comprising the steps of:

a) positioning a calibration means within the robot envelope, wherein said calibration means includes a beam having a centerline positioned along a single line;

b) positioning a first of said pair of opposed tool tips within the path of said beam;

c) profiling said first tool tip by moving said welding tool relative to said beam;

d) positioning said first tool tip to an initial position based upon said profiling where said beam path intersects said first tool tip at a center point positioned at a midpoint of a substantially cylindrical portion of said first tool tip;

e) calculating an initial approximation for said center point position of said first tool tip;

f) obtaining values of said robot face plate with said tool tip at said initial position;

g) rotating said welding tool from said initial position to a second position about an axis substantially perpendicular to said calibration means to a second position;

h) obtaining values of said robot face plate with said tool tip at said second position;

i) rotating said welding tool about said axis substantially perpendicular to said calibration means to a third position;

j) obtaining values of said robot face plate with said tool tip at said third position;

k) rotating said welding tool about an axis substantially parallel to said calibration means to a fourth position;

l) obtaining values of said robot face plate with said tool tip at said fourth position;

m) calculating said center point position of said first tip based upon said obtained values;

n) repeating steps b through m for the second of said pair of tool tips; and o) calculating said tool centerline which is along the line extending between the center points of said pair of tool tips.

8. The method of claim 7 wherein said tool tip profiling comprises:

sequentially determining the cross-sectional lengths of said tool tip in planes parallel to the beam, wherein a plurality of substantially similar cross-sectional lengths in adjacent planes indicates said substantially cylindrical portion of said tool tip.

9. The method of claim 8 wherein four substantially similar cross-sectional lengths of said tool tip during profiling indicate the presence of said substantially cylindrical portion.

10. The method of claim 7 further comprising the step of:

p) aligning said tool based upon the location of said centerline, wherein steps b through o are repeated following said tool alignment.

11. The method of claim 7 wherein following said centerline calculation, said pair of tool tips is profiled to find a narrowest profile between said center points of said first and said second tool tips wherein a tool center point is calculated along said narrowest profile.

12. The method of claim 11 wherein said tool center point is the intersection of the plane of said narrowest profile and said centerline.

13. The method of tool calibration for a robot comprising the steps of:

a) positioning a calibration means with the robot envelope, wherein said calibration means includes a beam having a centerline positioned along a single line;

b) positioning said tool within the path of said beam;

c) profiling said tool by moving said tool relative to said beam to sequentially determine cross-sectional lengths of said tool in planes parallel to said calibration means, wherein a plurality of substantially similar cross-sectional lengths indicates a substantially cylindrical portion of said tool;

d) calculating a midpoint of said tool along said substantially cylindrical portion; and e) aligning said tool based upon said calculated midpoint.

14. The method of claim 13 wherein four substantially similar cross-sectional lengths of said tool tip during profiling indicate the presence of said substantially cylindrical portion.

15. The method of claim 14 wherein four additional cross-sectional lengths are calculated after four substantially similar cross-sectional lengths are determined.

* * * * *

UNITED STATES PATENT AND TRADEMARK OFFICE
CERTIFICATE OF CORRECTION

PATENT NO. : 5,457,367
DATED : October 10, 1995
INVENTOR(S) : Henry F. Thorne

It is certified that error appears in the above-indentified patent and that said Letters Patent is hereby corrected as shown below:

```
Column 4 Line 35 after "cell" insert --adjacent an
     assembly line A--.

Column 4 Line 35 after "envelope" insert --E--.

Column 6 Line 37 after "point" insert --from position TA
     to position TB--.

Column 6 Line 40 after "44" insert --at position TC--.

Column 7 Lines 33-34 before "wherein" delete "0".
```

Signed and Sealed this

Second Day of July, 1996

*Attest:*

BRUCE LEHMAN

*Attesting Officer*     Commissioner of Patents and Trademarks